Figure 1:
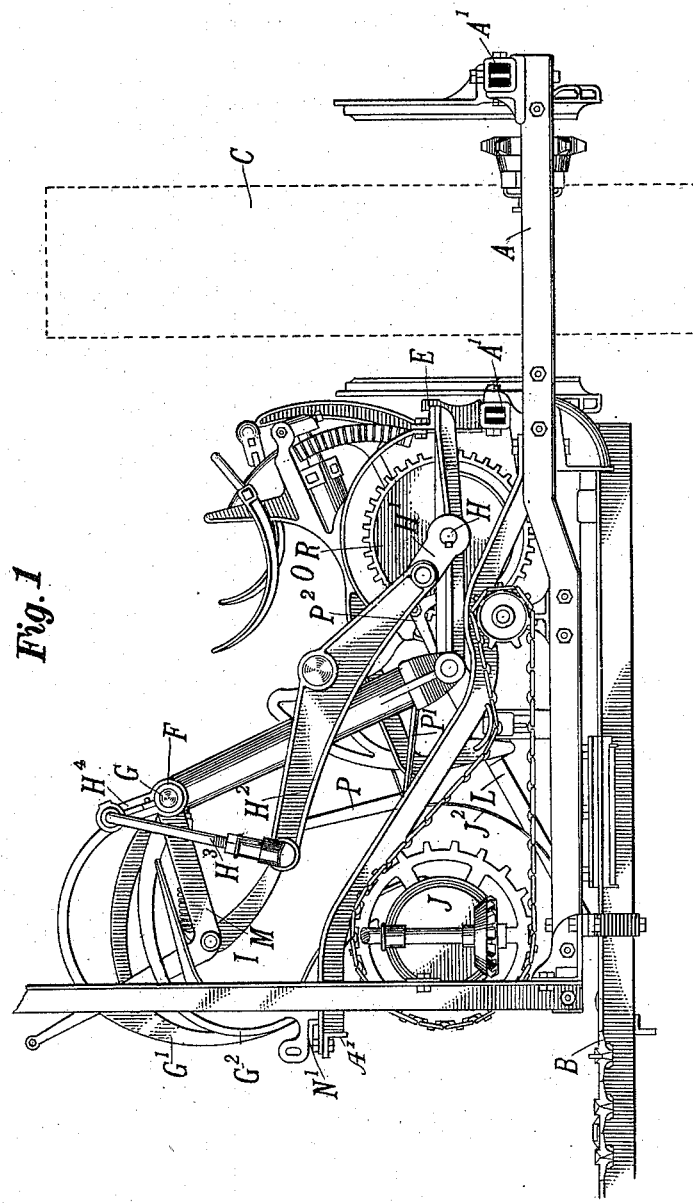

(No Model.) 3 Sheets—Sheet 1.

J. R. SEVERANCE.
SELF BINDING HARVESTER.

No. 571,403. Patented Nov. 17, 1896.

Witnesses
John M. Culver
Lewis H. Williams

Inventor
James R. Severance
By his Attorney R. B. Swift.

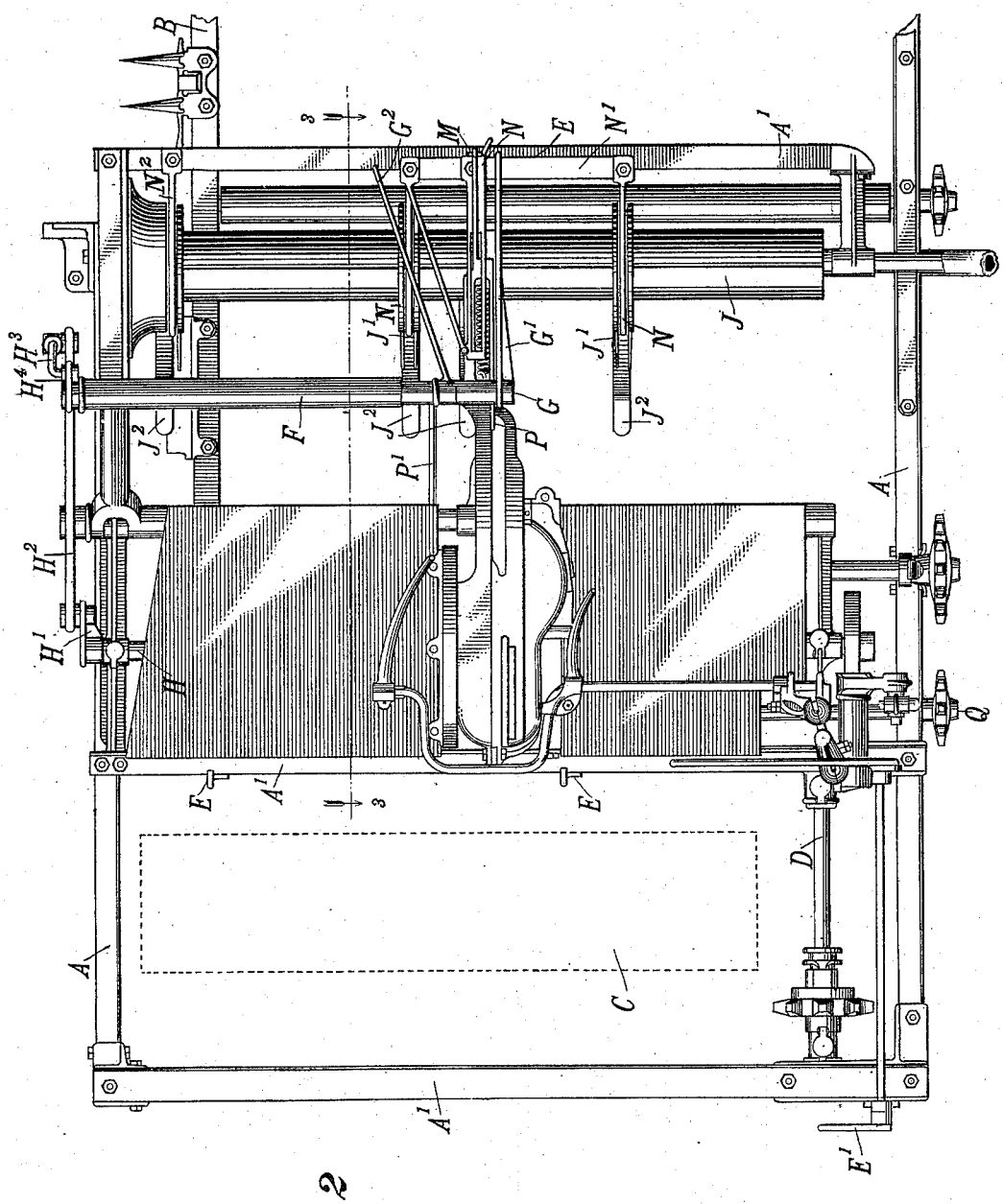

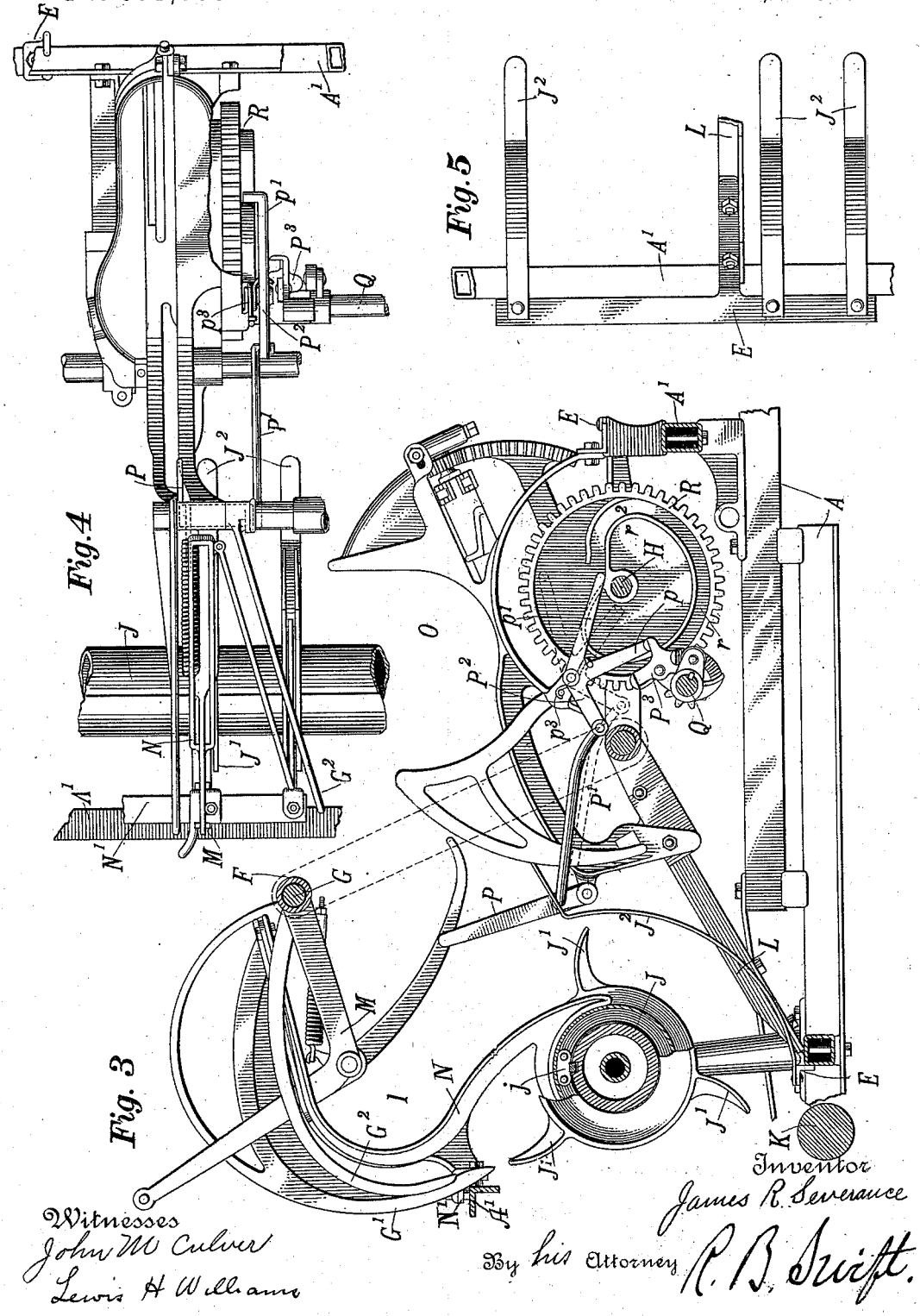

UNITED STATES PATENT OFFICE.

JAMES R. SEVERANCE, OF CHICAGO, ILLINOIS, ASSIGNOR TO THE McCORMICK HARVESTING MACHINE COMPANY.

SELF-BINDING HARVESTER.

SPECIFICATION forming part of Letters Patent No. 571,403, dated November 17, 1896.

Application filed December 11, 1893. Serial No. 493,418. (No model.)

*To all whom it may concern:*

Be it known that I, JAMES R. SEVERANCE, a citizen of the United States, residing at Chicago, in the county of Cook and State of Illinois, have invented a new and useful Improvement in Self-Binding Harvesters, of which the following is a specification.

My invention relates to improvements in self-binding harvesters of a low elevating type, and is particularly applicable to the type of machine described and shown in Letters Patent 452,460, granted to me May 19, 1891; and the objects of my invention are to provide a throatway for the passage of the grain that shall have a large capacity, to simplify the construction of this throatway, to provide an easier adjustment for the parts that force the grain through this throat, and to so arrange these parts that they will be more effective in operation and allow the use of an adjustable butt-hook of practically the same sweep as the needle. A simple tripping device, that also acts as a cut-off, is provided, and certain details of construction arranged that will be more fully pointed out. I attain these objects by the mechanism illustrated in the accompanying drawings, in which—

Figure 1 is an end view of so much of a low-level self-binding harvester as will show the type of machine to which my improvements are applicable. Fig. 2 is a top view of the same, showing the construction and arrangement of my improvements. Fig. 3 is a section on the line 3 3 of Fig. 2. Figs. 4 and 5 are enlarged detail plan views of the parts somewhat shown in Fig. 2.

Similar letters refer to similar parts throughout the several views.

The sills A A', finger-bar B, wheel C, and shafting and gearing D constitute the framework and give the motive power to the machine. The binding attachment as a whole is positioned on this framework between the main wheel and the platform that carries the cutting devices and is adjustable for long and short grain on the guiding-ways E E E. A suitably-positioned lever E', convenient to the driver, allows him to place the binder so as to centrally bind the grain.

Pivoted on the binder-framing is the swinging binder-arm F, which carries in its upper rocking portion the needle-shaft G. The needle G' and the butt-hook $G^2$ are securely keyed to this shaft and follow the movement of the binder-arm F, as well as have a movement of their own given to them by the rotating of the main binder-shaft H, which, by means of its crank H' and lever $H^2$, not only gives the binder-arm F this movement forwardly and backwardly, but by means of the lever $H^2$ and pitman $H^3$ and crank $H^4$ give the needle and butt-hook a reciprocating movement to surround the accumulated grain and bind it into bundles.

The grain is fed into the receptacle I by means of the rotating drum J, carrying the feed-teeth J', and is brought within reach of the feed-teeth on the rotating drum by the usual platform-apron, which is not shown in the drawings. The roller K, however, is the inner roller for the platform-apron. The grain is held on the feed-teeth J' by the feed-springs $J^2$, which practically have the same inward and upward course as the path made by the point of the feeder-teeth in their rotation. These feed-springs $J^2$ are attached only at their receiving ends, their discharge end being bent downward toward a horizontal to form a support for the grain, so that the gavel, as it is swept across by the needle toward the bundle-receptacle, may be supported in its passage to the binding-receptacle. Heretofore feed-springs of this description have been supported from both ends, or, if not from both ends, by arms from their centers. Such supports retard the upward progress of the grain whenever the grain gets beneath the feed-springs, which it frequently does when it is brought forward by the platform-apron at all endwise. By attaching the feed-springs at their receiving ends only any grain that passes beneath them can be easily worked out by the onward movement of the accumulated grain forced forward by the feed-teeth or by the binder as it rocks across the throat carrying the accumulated gavel toward the binding-receptacle. To give this throatway a larger capacity and to construct it so that the grain will not be hindered in its onward passage through it, is one of the features of my invention.

As a further precaution to the end of giving the throatway as large an amount of capacity as possible the central feed-springs $J^2$ are attached to a part of the binder-frame, so that as the binder is moved forwardly and backwardly for centrally binding the grain these feed-springs will move with it. This is accomplished by extending from the binder-frame to the cross-girth of the harvester-frame, beneath the feed-drum, an arm L, and upon an extension of this arm, parallel with the feed-drum, the feed-springs $J^2$ are attached. The forward feed-sprocket with its feed-spring and clearer-scroll $N^2$ are positioned so that they will act upon the butts of the grain and are stationary, but the central ones, as explained, are adjustable in the manner described.

The feed-springs $J^2$ being adjustable it has been found necessary to adjust their corresponding feed-teeth $J'$ on the drum J, that the feed-teeth and feed-springs may be together for proper work. This has been accomplished by passing the compressor M, which is journaled on the needle-shaft G and is moved forwardly and backwardly as the binder is adjusted, through a slot in one of the feeder-scrolls N. The lower extension of this feeder-scroll is continued to the feed-drum J and passes between the feed-teeth $J'$. An arm from near the central part of the feeder-scroll is attached to the parallel bar $N'$, which moves along the sill $A'$ in guiding-ways.

From this description it will be seen that when the binder is adjusted the feed-scrolls, with the feed-teeth $J'$, will be moved with it, inasmuch as the feed-teeth are loosely mounted, so that they can be slid lengthwise on the feed-drum J. The feed-teeth $J'$ are splined by the key $j$ to the drum J, so that they will be rotated by it. As it is better that the grain be agitated by as few feed devices as possible it has been found desirable to make more than one of these feed-teeth, with their scrolls and springs, adjustable, and to this end the central feed-scroll end is connected to a bar, as explained, which moves in guiding-ways on the sill $A'$, as shown in Figs. 2 and 4. To this bar the feed-scrolls N N are attached, and as they are adjusted their lower ends encircling the feed-teeth $J'$, the necessary parts are moved in unison. By this construction fewer feed appliances are needed, as they can be placed for short grain where the grain is received and for long grain where it is necessary to be acted upon. This adjustment of the feeding devices, however, has another and very essential object. It has been found in lodged and tangled grain that while the binder-arm encircles the gavel and sweeps it from the primary receptacle I to the binding receptacle O the butts of the grain will be entangled and that they will hang back and thus clog the machine. To prevent this, a butt-hook G is keyed to the binder-shaft and operates with it. If the feeding devices were positioned rigidly upon the sill $A'$ and the butt-hook were given a sweep practically corresponding with that of the needle, it might strike the feeding devices as the binder was adjusted forwardly and backwardly. With the feeding device, however, moving with the binder and butt-hook there is always an open space for the passage of the butt-hook, and it can have, as has been found desirable, practically the same sweep as the needle, thus encircling and carrying forward the amount of grain that the needle has surrounded. Having a long sweep, the butt-hook $G^2$ drops into the throat and assists the feeder-drum in bringing forward the grain. With a shorter stroke it would be forced to make its passage through the accumulated grain unassisted by the feed-teeth on the feed-drum, and would leave considerable of the grain that has been surrounded by the needle hanging behind and thus prevent a square-butted bundle being formed.

Another feature of my invention is found in the tripping-finger P, which is pivoted to the binder-frame so as to extend across the passage-way leading from the primary receptacle I to the binding-receptacle O. The grain is fed forward by the feed-teeth into this first receptacle I, and when sufficient grain has accumulated it presses against the trip-finger and rocks it on its pivot. A connecting-link $P'$ extends from the trip-finger P or a crank thereon to a trip-stop $P^2$, pivoted to the knotter-frame, one arm of which will be thrown within the path of the trip-dog $P^3$ at each operation of binding a bundle. The binder is started in operation by the grain pressing the trip-finger P backwardly, thus lifting, through its connecting device, the arm $p$ of the trip-stop $P^2$. The trip-dog $P^3$ is then clutched with the driving-shaft Q, the upper arm $p'$ of the trip-stop $P^2$ is raised, and the driven cam-wheel forces the trip-finger P down, and the grain passes over it in its passage toward the binding-receptacle O, and is there bound into a bundle. In the meantime the cam-wheel R has continued its movement, the upper arm $p'$ of the trip-stop being brought within the cam-track $r$. As the bundle has passed over the trip-finger P and the binding operation is about completed the cam-wheel R has revolved so that the upper arm $p'$ of the trip-stop is struck by the deflecting part of $r^2$ of the cam-track $r$ and brought to its original position, thus throwing the lower arm $p$ of the trip-stop into the path of the trip-dog and unclutching it from the driving-shaft wheel. This action also causes the trip-finger P to swing upwardly and to act as a cut-off, separating and pushing back the grain that has meantime accumulated at the entrance to the binding-receptacle. When sufficient grain is accumulated, the operation will again be repeated. The spring $p^3$ serves to hold the trip-stop and trip-dog together until its stress is overcome by the force of the accumulated grain.

Having now described my invention, what

I claim, and desire to secure by Letters Patent, is—

1. In a self-binding harvester, the combination of a binder located between the platform and the main wheel, a passage-way from the platform to the binding-receptacle, and spring-straps forming the bottom of the passage-way, said straps being connected at the receiving end of the passage-way only with the binder-frame so as to be adjustable with it in its movements.

2. In a self-binding harvester, the combination of a binder located between the platform and the main wheel, a passage-way from the platform to the binding-receptacle, and spring-straps forming the bottom of the passage-way and secured to a projection from the binder-frame at their receiving ends so as to be adjustable therewith in its movements, the discharge ends of said straps being free and unattached and bent toward the binding-receptacle.

3. In a self-binding harvester, the combination of an adjustable binder, situated between the platform and the main wheel, a passage-way from the platform to the binding-receptacle, spring-straps forming the bottom of the passage-way, said straps being secured to a projection from the binder-frame at the receiving end of the passage-way only so as to be adjustable with the binder, and a feeding device located above the incoming grain and having feed-teeth corresponding to the spring-straps on the opposite side of the passage-way, said feeding-teeth being also connected to the binder so as to be adjustable therewith.

4. In a self-binding harvester, the combination of an adjustable binder situated between the platform and the main wheel, a passage-way from the platform to the binding-receptacle, spring-straps forming the bottom of the passage-way, said straps being secured to a projection from the binder-frame at their receiving ends only so as to be adjustable with the binder, a feeding device located above the incoming grain, and having feed-teeth corresponding to the spring-straps, and clearer-bars corresponding to the feed-teeth, said feeding device and clearer-bars being also connected with the binder so as to be adjustable therewith.

5. The combination with an adjustable binder, of a feeding device adjustable therewith and given its movement by an arm projecting from the binder-frame through the slot in one of the clearer-bars which move the teeth of the feeding device.

6. The combination, in a self-binding harvester, of a feeding device located at the delivery end of the platform in a plane above it, said device consisting of revolving feed-teeth, a primary receptacle above the feeding device to and into which the grain is forced and accumulated by said feeding device, a binding-receptacle beyond the primary receptacle, stationary scrolls to strip the grain from the revolving feed-teeth, said scrolls forming one wall of the primary receptacle, curved guides that hold the grain on the feed-teeth and form one side of the passage-way to the primary receptacle, a trip-finger located and arranged at one side of said way and extended up to form the opposite wall of the primary receptacle from the scrolls and normally separating it from the binding-receptacle, and connections between the tripping-finger and a clutch, whereby when the primary receptacle is filled with grain by the feeding devices the force to move the finger and clutch the binder is transmitted from said device through the grain in the receptacle to the trip-finger, after which the grain is transferred to the binding-receptacle for binding.

7. The combination, in a self-binding harvester, of a feeding device located at the delivery end of the platform in a plane above it, a primary receptacle above the feeding device to and into which the grain is carried and accumulated by the feeding device, a trip-finger positioned at one side of the passage-way and extended up to form one wall of the primary receptacle normally separating it from the binding-receptacle, and connections between the finger and the clutch, whereby when the primary receptacle is filled with grain by the feeding device, the force to move the finger and clutch the binder is transmitted from said device through the grain in the receptacle to the finger after which the grain is transferred to the receptacle where it is bound.

JAMES R. SEVERANCE.

In presence of—
LEWIS H. WILLIAMS,
JOHN M. CULVER.